(12) United States Patent
Øllgaard (10) Patent No.: US 7,928,593 B2
(45) Date of Patent: Apr. 19, 2011

(54) METHOD FOR DAMPING OSCILLATIONS IN A WIND TURBINE

(75) Inventor: Børge Øllgaard, Esbjerg (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/744,614

(22) PCT Filed: Nov. 27, 2008

(86) PCT No.: PCT/EP2008/066308
§ 371 (c)(1),
(2), (4) Date: Aug. 16, 2010

(87) PCT Pub. No.: WO2009/068599
PCT Pub. Date: Jun. 4, 2009

(65) Prior Publication Data
US 2010/0314883 A1    Dec. 16, 2010

(30) Foreign Application Priority Data
Nov. 28, 2007    (DK) .................................. 2007 01685

(51) Int. Cl.
*F03D 7/04*    (2006.01)
(52) U.S. Cl. ............................................. 290/44; 416/18
(58) Field of Classification Search .................... 290/43, 290/44, 54, 55; 416/18, 139
See application file for complete search history.

(56) References Cited

U.S. PATENT DOCUMENTS

| | | | |
|---|---|---|---|
| 4,042,070 A | 8/1977 | Flannelly | |
| 4,083,651 A * | 4/1978 | Cheney et al. | ........... 416/11 |
| 6,327,957 B1 * | 12/2001 | Carter, Sr. | ........... 91/41 |
| 6,672,837 B1 | 1/2004 | Veldkamp et al. | |
| 7,400,055 B2 * | 7/2008 | Nagao | ........... 290/44 |

(Continued)

FOREIGN PATENT DOCUMENTS

DE    26 16 899    10/1977

(Continued)

OTHER PUBLICATIONS

Gabriele Giorgini; International Preliminary Report on Patentability issued in related PCT Application No. PCT/EP2008/066308; Mar. 31, 2010; 9 pages; European Patent Office.

(Continued)

*Primary Examiner* — Nicholas Ponomarenko
(74) *Attorney, Agent, or Firm* — Wood, Herron & Evans, L.L.P.

(57) ABSTRACT

The present invention relates to a method for damping oscillations in a wind turbine comprising a wind turbine tower, a nacelle arranged on top of said wind turbine tower, and a number of rotor blades rotatably connected to the nacelle. The oscillations to be damped originate from forces induced on the nacelle and the wind turbine tower by the rotating rotor blades. The method comprises the steps of providing an internally suspended pendulum mass structure being operationally connected to an upper tower section, providing a platform being fixedly attached to the upper tower section, and providing damping means comprising one or more friction members being displaceably arranged relative to the platform, the one or more friction members being adapted to be displaced relative to the platform in response to relative movements between the suspended pendulum mass structure and the platform in order to dissipate energy from the suspended pendulum mass structure by friction.

11 Claims, 4 Drawing Sheets

U.S. PATENT DOCUMENTS

2006/0066111 A1     3/2006     Suryanarayanan et al.
2009/0200804 A1*    8/2009     Nielsen et al. .................. 290/44

FOREIGN PATENT DOCUMENTS

| | | |
|---|---|---|
| DE | 32 15 428 | 11/1983 |
| EP | 1 045 988 | 7/1999 |
| EP | 1 008 747 | 6/2000 |
| EP | 1 643 122 | 4/2006 |
| EP | 1 677 003 | 7/2006 |
| GB | 2 153 463 | 8/1985 |
| JP | 59 147879 | 8/1984 |

OTHER PUBLICATIONS

Gabrielle Giorgini; International Search Report issued in priority application No. PCT/EP2008/066308; Oct. 29, 2009; 5 pages; European Patent Office.

* cited by examiner

METHOD FOR DAMPING OSCILLATIONS IN A WIND TURBINE

FIELD OF THE INVENTION

The present invention relates to a method for damping oscillations in a wind turbine tower. Furthermore, the present invention relates to a wind turbine having a oscillation damping arrangement positioned near the top of the wind turbine tower.

BACKGROUND OF THE INVENTION

Varying damping arrangements for wind turbines have been suggested in the patent literature.

For example, U.S. Pat. No. 6,672,837 relates to a wind turbine with oscillation damping means provided at the nacelle. The oscillation damping means is designed for damping edgewise oscillations of the rotor blades in the rotational plane of the rotor.

In particular, the oscillation damping means suggested in U.S. Pat. No. 6,672,837 relates to a wind turbine in which the oscillation damping means are provided at the end of the nacelle, i.e. opposite the end from which the rotor extends. The damping means are designed for damping oscillations of the first fundamental frequency of the rotor blades in the rotational plane, especially oscillations being perpendicular to the rotational axis of the rotor.

Also, various electrically based damping arrangements have been suggested. For example, US 2006/066111 discloses a vibration damping technique for a wind turbine system. The wind turbine system includes a vibration damper which provides a variable signal to control torque produced by a generator of the wind turbine system. The variable signal is based on generator speed and has a first local peak value based on a resonance frequency of tower side-to-side oscillation. Another electrically based damping arrangement is suggested in EP 1 045 988.

It may be seen as an object of embodiments of the present invention to provide a method and an arrangement for damping rotor blade induced oscillations in wind turbines.

It may be seen as a further object of embodiments of the present invention to provide a method and an arrangement which can easily be installed in existing wind turbines. Other objects appear from the description and figures.

DESCRIPTION OF THE INVENTION

The above-mentioned objects are complied with by providing, in a first aspect, a method for damping oscillations in a wind turbine comprising a wind turbine tower, a nacelle arranged on top of said wind turbine tower, and a number of rotor blades rotatably connected to the nacelle, said oscillations being generated by forces induced on the nacelle and the wind turbine tower by the rotating rotor blades, the method comprising the steps of providing an internally suspended pendulum mass structure being operationally connected to an upper tower section, providing a platform being fixedly attached to the upper tower section, and providing damping means comprising one or more friction members being displaceably arranged relative to the platform, the one or more friction members being adapted to be displaced relative to the platform in response to relative movements between the suspended pendulum mass structure and the platform in order to dissipate energy from the suspended pendulum mass structure by friction.

The wind turbine may in principle be any type of wind turbine, such as for example pitch or stall regulated wind turbines. Also, the wind turbine may be capable of producing electricity from a few hundreds of kWs to several MWs. Similarly, the wind turbine may be positioned on land or even at sea as an off-shore wind turbine.

The damping mechanism utilized in the present invention involves, in principle, all kinds of damping mechanisms where damping is provided by friction between two or more mutually displaceable objects. Thus, the term "by friction" should be understood as an arrangement where frictional forces between at least two objects, such as two friction plates, are applied to reduce unwanted oscillations.

The suspended pendulum mass structure may be operationally connected to the upper wind turbine tower section via one or more suspension rods, via one or more suspension wires or via a combination thereof. Preferably, the suspended pendulum mass structure is suspended inside the wind turbine tower in an excentric manner relative to a longitudinal centre axis of the tower. The latter enables an improved use of the internal space in the tower, which may be used for e.g. a central elevator in the tower.

The friction members may be adapted to be displaced, directly or indirectly, by the one or more suspension rods, the one or more suspension wires or a combination thereof. Alternatively or in addition, the friction members may be adapted to be displaced, directly or indirectly, by an activation element fixedly attached to the suspended pendulum mass structure. The activation element may be a rod fixedly attached to the suspended pendulum mass structure.

The friction members may be positioned above and/or below the suspended pendulum mass structure, or they may be integrated with or forming part of one or more suspension wires.

The friction members may comprise a plurality of stacked, mutually displaceable friction plates. Each friction plate may be disc-shaped having a through-going opening being adapted to receive a rod-shaped drive member operatively connected to the suspended pendulum mass structure, or operatively connected to the one or more suspension wires or one or more suspension rods. The through-going openings may for example take a circular or elliptical shape.

In a first embodiment of the present invention, the suspended pendulum mass structure may be essentially symmetric around a centre axis thereby forming a 360 degrees structure, and it may constitute an essentially solid structure of for example steel having a weight of only a few percent or less of the weight of the tower of the wind turbine. Thus, the suspended pendulum mass structure may have a mass within the range 50 kg-10 ton, such as within the range 100 kg-9 ton, such as within the range 500 kg-9 ton, such as within the range 1-9 ton, such as within the range 2-8 ton, such as within the range 3-7 ton, such as approximately 5 ton.

The number of disc-shaped friction plates may be within the range 2-10, such as within the range 3-9, such as within the range 3-8, such as within the range 3-7, such as within the range 3-6, such as within the range 3-5, such as 4 disc-shaped friction plates. The plurality of disc-shaped friction plates may be made of stainless steel.

Each of the plurality of disc-shaped friction plates may have an outer diameter within the range 100-1000 mm. Similarly, each of the plurality of disc-shaped friction plates may have a thickness within the range 1-100 mm, and a weight within the range 0.1-10% of the mass of the suspended pendulum mass structure.

In a second embodiment of the present invention, the damping means is provided below the suspended pendulum mass structure. According to the second embodiment the damping means is not activated by the one or more suspension wires or the one or more suspension rods. On the contrary, the damping means is activated by a drive rod fixedly attached to the suspended pendulum mass structure. The friction members may comprise a plurality of stacked, mutually displaceable friction plates. In terms of implementation the friction members may be implemented following the same design route as discussed in connection with the first embodiment of the present invention.

It should be noted that a damping arrangement being a combination of the first and second embodiments is also applicable.

In a third embodiment of the present invention, the suspended pendulum mass structure may comprise an arch-shaped pendulum structure comprising a passage in its circumference thereby allowing service personal to easily pass the arch-shaped pendulum structure when the arch-shaped pendulum structure is suspended in the upper tower section. The arch-shaped pendulum structure may extend over an angle within the range 275-325 degrees, such as approximately 300 degrees.

The arch-shaped suspended pendulum mass structure may have a mass within the range 50 kg-10 ton, such as within the range 100 kg-9 ton, such as within the range 500 kg-9 ton, such as within the range 1-9 ton, such as within the range 2-8 ton, such as within the range 3-7 ton, such as approximately 5 ton.

The damping means according to the third embodiment of the present invention may comprise a first and a second set of friction members, the first and second set of friction members preferably being attached to two points along the circumference of the arch-shaped pendulum structure. As with the first embodiment of the present invention each of the first and second set of friction members may comprise a plurality of mutually, displaceable disc-shaped friction plates, each disc-shaped friction plate having a central through-going opening being adapted to receive a rod-shaped drive member operatively connected to the suspended pendulum mass structure, or operatively connected to the one or more suspension wires or one or more suspension rods. As previously mentioned the through-going openings of the disc-shaped friction plates may for example take a circular or elliptical shape.

In the third embodiment of the present invention the damping means may further comprise a third friction member comprising a plurality of stacked and mutually, displaceable disc-shaped friction plates, each having a central through-going opening being adapted to receive a rod-shaped drive member operatively connected to the suspended pendulum mass structure, or operatively connected to the one or more suspension wires or one or more suspension rods. The third damping means may be attached to a third point along the circumference of the arch-shaped pendulum structure.

The number of disc-shaped friction plates constituting the third friction member may be within the range 2-10, such as within the range 3-9, such as within the range 3-8, such as within the range 3-7, such as within the range 3-6, such as within the range 3-5, such as 4 disc-shaped friction plates. The plurality of disc-shaped friction plates may be made of stainless steel. Each of the plurality of disc-shaped friction plates may have an outer diameter within the range 100-1000 mm. Similarly, each of the plurality of disc-shaped friction plates may have a thickness within the range 1-100 mm, and a weight within the range 0.1-10% of the mass of the suspended pendulum mass structure.

In a second aspect, the present invention relates to a wind turbine comprising a wind turbine tower, a nacelle arranged on top of said wind turbine tower, and a number of rotor blades rotatably connected to the nacelle, the wind turbine further comprising an arrangement for damping oscillations being generated by forces induced on the nacelle and the wind turbine tower by the rotating rotor blades, said arrangement comprising an internally suspended pendulum mass structure being operationally connected to an upper tower section, a platform arranged inside the upper tower section and fixedly attached thereto, and damping means comprising one or more friction members being displaceably arranged relative to the platform, the one or more friction members being adapted to be displaced relative to the platform in response to relative movements between the suspended pendulum mass structure and the platform in order to dissipate energy from the suspended pendulum mass structure by friction.

As stated previously, the wind turbine may be any type of wind turbine, such as for example pitch or stall regulated wind turbines of sizes ranging from a few hundreds of kWs to several MWs. Similarly, the wind turbine may be positioned on land or even at sea as an off-shore wind turbine.

The wind turbine may further comprise safety enclosure means at least partly encapsulating the suspended pendulum mass structure, the safety enclosure means being adapted to maintain the suspended pendulum mass structure in a secure position during abnormal wind turbine working conditions. In a worst case scenario abnormal working conditions could be a situation where one or more suspension wires or one or more suspension rods breaks. The safety enclosure means may be implemented in such a way that the suspended pendulum mass structure is allowed to oscillate with a predetermined maximum amplitude.

The safety enclosure means may be fixedly attached to the upper wind turbine tower section, or fixedly attached to the platform.

Preferably, the suspended pendulum mass structure is arranged in an excentric manner relative to a longitudinal centre axis of the tower. The friction members may comprise a plurality of stacked, mutually displaceable friction plates. In terms of implementation the friction members may be implemented following the same design route as discussed in connection with the first aspect of the present invention.

BRIEF DESCRIPTION OF THE DRAWINGS

The present invention will now be explained in further details with reference to the accompanying figures, wherein.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

In its broadest aspect the present invention relates to a method for damping rotor blade induced oscillations in a wind turbine. Such oscillations are caused by forces acting on a nacelle due to forces induced by the rotating rotor blades. The wind causes the rotor blades to rotate and these rotating forces are transmitted to a wind turbine generator adapted to produce electrical power. The forces transmitted to the generator are often provided via a gear box. When electrical power is produced a number of reaction forces are induced on the nacelle by the generator and the gear box.

The method according to the present invention involves providing a suspended pendulum mass structure within an upper tower section of the wind turbine, and providing a friction-based damping arrangement for damping relative movements between the suspended mass structure and the upper wind tower section. The present invention further relates to a wind turbine comprising a damping arrangement.

Figure 1:
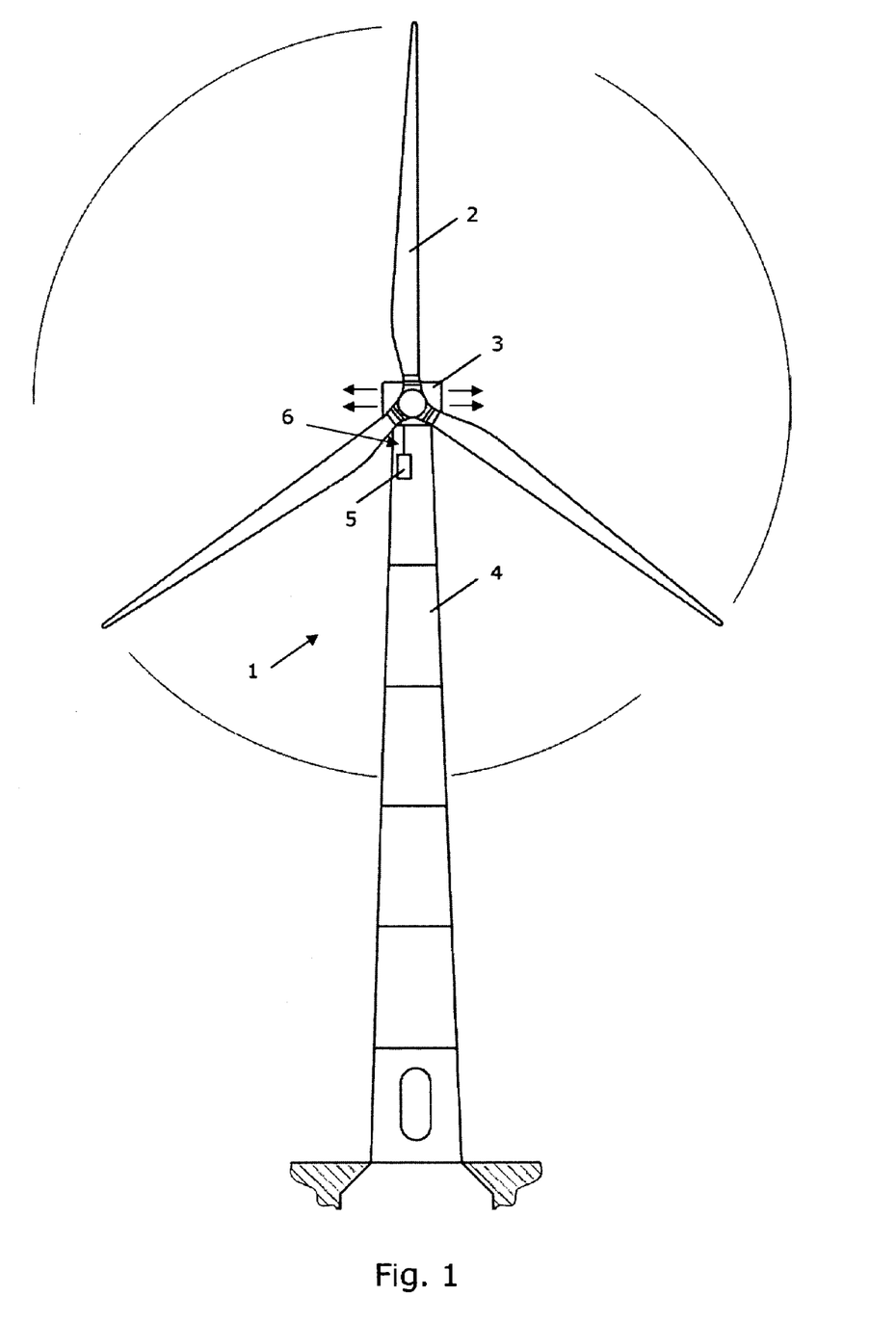
FIG. 1 shows a wind turbine with a damper installed.

Referring now to FIG. 1 a wind turbine 1 comprising a tower 4, a nacelle 3 and a set of rotatably mounted rotor blades 2 is depicted. As indicated by the arrows in FIG. 1 gusts of wind may cause the wind turbine to oscillate from side to side.

To damp such oscillations a pendulum type friction damper 5 is suspended from a lower surface of a top platform. The mass of the pendulum can be as low as 1 percent of the mass of the wind turbine. Thus, if the mass of the wind turbine is 100 ton the mass of the pendulum suspended inside the tower can be as low as 1 ton. However, pendulum masses of around 5 ton are also applicable.

Figure 2:
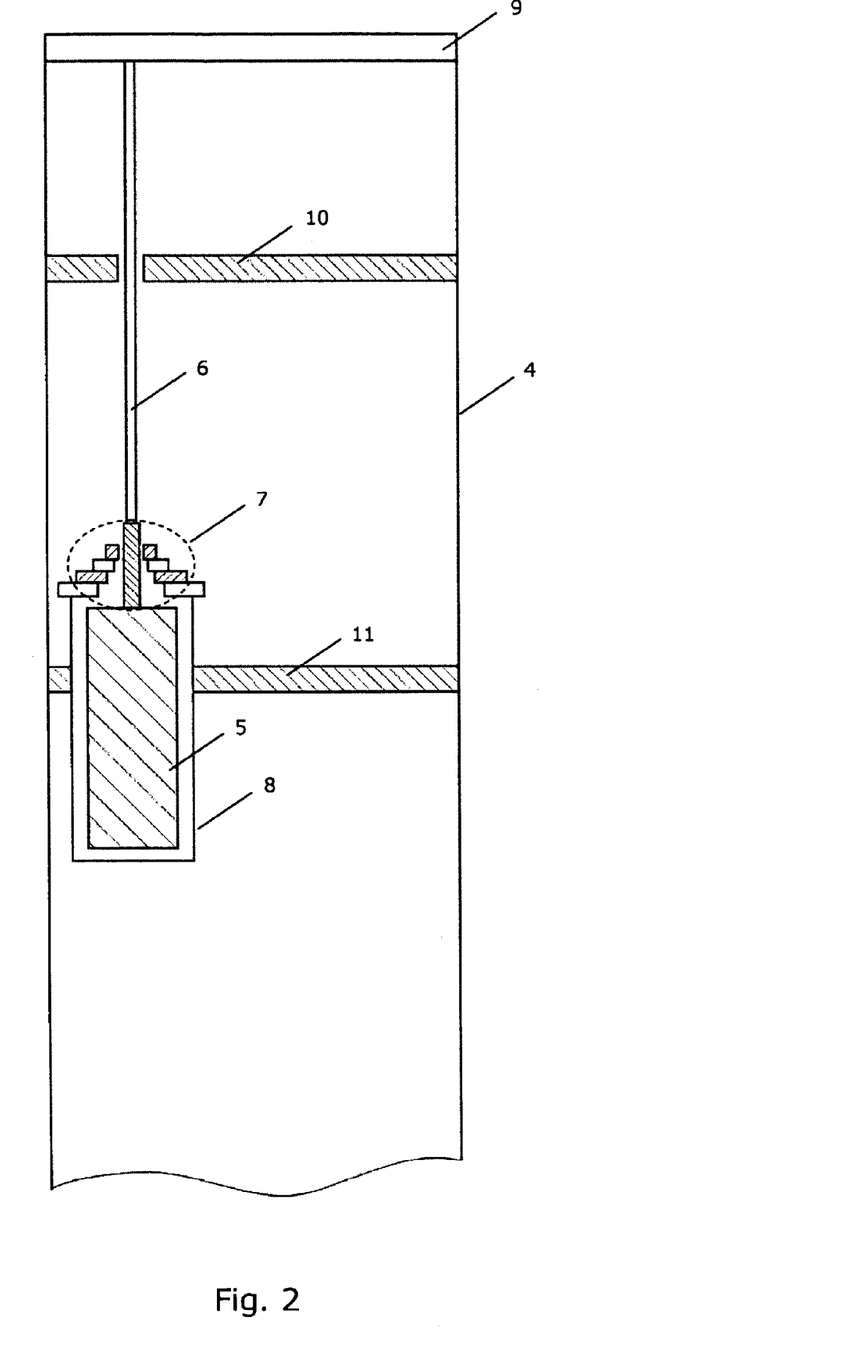
FIG. 2 shows a friction damper according to a first embodiment.

Referring now to FIG. 2 a close-up view of the upper tower section is depicted. In FIG. 2 the pendulum type friction damper 5 is suspended in a suspension wire 6 which, at one end, is secured to a top platform 9 of the tower whereas the other end is secured to the pendulum 5. Optionally, the suspended pendulum mass structure 5 may be suspended in one or more substantially stiff suspension rods, in a plurality of suspension wires or in a combination thereof.

When the wind turbine tower starts to oscillate from side to side due to for example gusts of wind, the pendulum 5 starts to oscillate as well. In order to damp oscillations of the tower, and of course at the same time also the nacelle and the rotor blades, the pendulum 5 is operatively connected to the tower via a damping arrangement 7 which is shown in greater details in FIG. 3. In FIG. 2 the damping arrangement is implemented on top of the safety enclosure 8. Alternatively, the damping arrangement could as well be implemented at a higher level platform, such as platform 10.

It should be noted that an arrangement for adjusting the length of the suspension wire 6 on site may optionally be provided. By providing a length adjustment of the suspension wire 6 the mechanical frequency characteristics of the pendulum type friction damper 5 can be matched to the frequency characteristics of the wind turbine thereby increasing the damping efficiency of the system.

As depicted in FIG. 2 the suspended pendulum mass structure 5 is at least partly encapsulated in a safety enclosure 8 which is fixedly attached to platform 11 which, again, is fixedly attached to the wind turbine tower 4. The aim of the safety enclosure 8 is to avoid, that the pendulum mass structure 5 falls to the bottom of the wind power tower in case the suspension wire 6 breaks. In addition, the safety enclosure 8 puts a maximum to the amplitude of the oscillations of the pendulum mass structure 5.

As depicted in FIG. 2 the safety enclosure 8 is dimensioned so that the pendulum mass structure 5 is allowed to oscillate freely within the safety enclosure 8 as long as the amplitude does exceed a predetermined maximum level. The amplitude may otherwise be dangerously high in the rare situation of an abrupt emergency stop of the wind turbine, due to the inertia in the rotor blades and transmission system.

Figure 3:
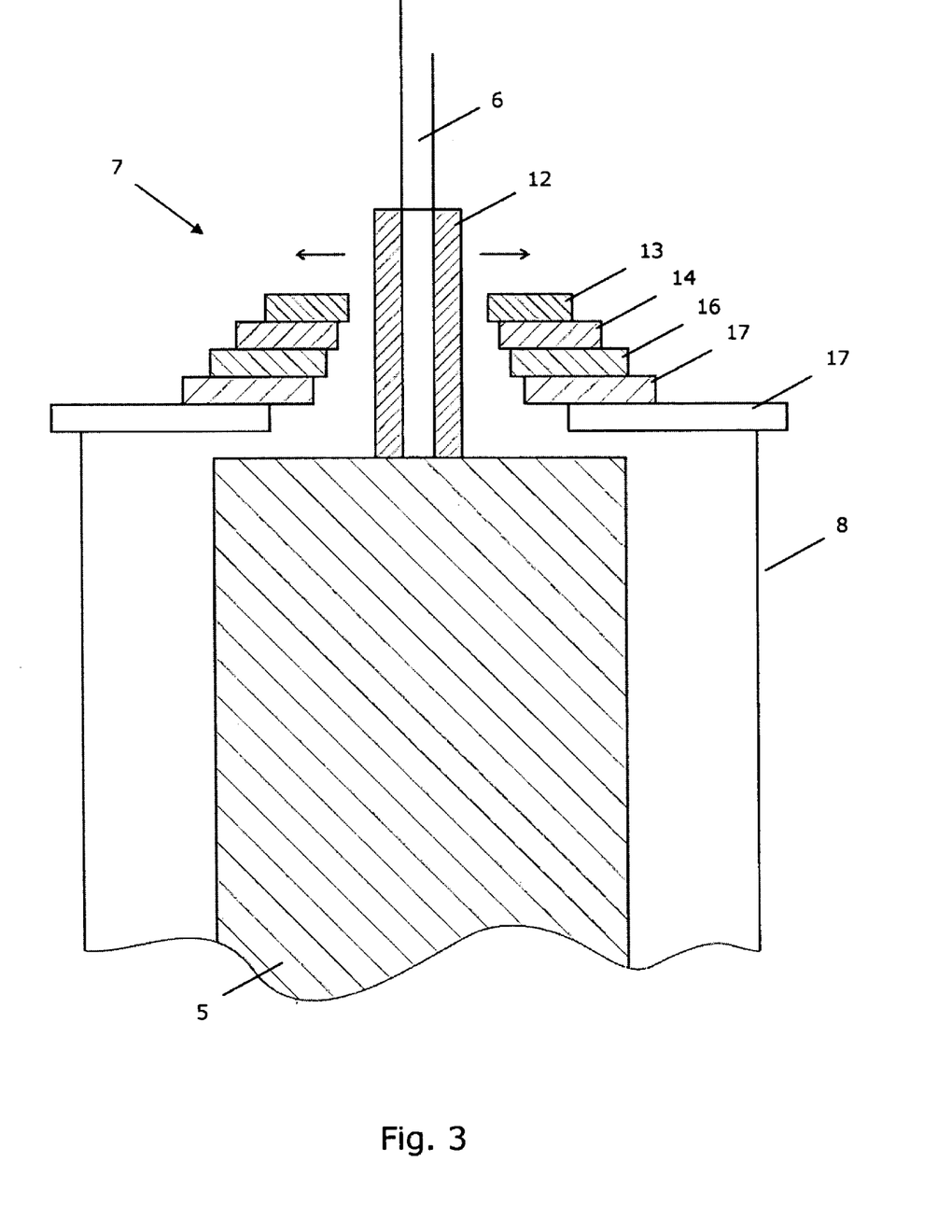
FIG. 3 shows a detailed depiction of a damping arrangement according to the first embodiment.

In FIG. 3 the safety enclosure 8, a suspension wire 6 and the suspended pendulum mass structure 5 are depicted in a close-up perspective. It should be noted that only a single suspension wire 6 is depicted in FIG. 3. Again, the suspension wire 6 is, at one of its ends, secured to the top platform of the tower whereas the other end of the suspension wire 6 is secured to the pendulum 5. Obviously, additional suspension wires or suspension rods can be applied.

The damping of the oscillations of the wind turbine is provided by a damping arrangement comprising a rod 12 extending into through-going openings of the friction plates 13, 14, 15 and 16 which are arranged to be moved across the base plate 17 which is fixedly attached to the safety enclosure 8. Thus, when the wind turbine tower and the pendulum mass structure 5 moves relative to each other the friction plates 13, 14, 15 and 16 are displaced relative to the base plate 17 and relative to each other. Due to frictional forces internally between the friction plates 13, 14, 15 and 16, and between friction plate 16 and the base plate 17 oscillations of the wind turbine is effectively damped.

The rod 12 functions as an outer lining. The outer lining is moveable relative to the suspension wire 6, and it can be made of a polymer material in order to obtain an essentially silent interaction with the friction plates 13, 14, 15 and 16. As depicted in FIG. 3 the rod/lining 12 rests on the pendulum mass structure 5 without being fixated to the suspension wire 6.

An advantage of the damping arrangement depicted in FIG. 3 is that it is capable of damping oscillations in all direction, i.e. in directions in the plane of FIG. 3 and in direction out of the plane of FIG. 3. The damping arrangement is also capable of damping oscillations being a combination of the before-mentioned directions.

FIG. 3 depicts the appliance of only one damping arrangement. However, a number of damping arrangements may be applied and operated in parallel. Thus, the number of damping arrangements may be one, two, three or even more. A plurality of damping arrangements may be provided above and/or below the suspended pendulum mass structure.

As previously mentioned the total mass of the pendulum is within the range 1-5% of the mass of the structure to be damped, here the mass of the wind turbine. In case of a 100 ton wind turbine the mass of the pendulum is within the range 1-5 ton.

The shape of the suspended pendulum mass structure may vary so as to fulfil specific demands. Thus, the suspended pendulum mass structure may be solid structure. Alternatively, the suspended pendulum mass structure may take the form of an arch-shaped pendulum structure suspended in for example three suspension wires or suspension rods. The opening of the arch-shaped pendulum structure allows service personal to pass through the pendulum structure in order to reach the nacelle of the wind turbine. Thus, by applying an arch-shaped pendulum structure covering around 300 degrees service personal is allowed easy access to the nacelle in case components installed in the nacelle need to be serviced, repaired or removed. In case the arch-shaped pendulum structure is suspended in three suspension wires or suspension rods three sets of friction plates are applied to provide the necessary damping. Such a plurality of sets of friction plates also dampen torsion like oscillations which are likely to occur in for example braced towers.

Figure 4:
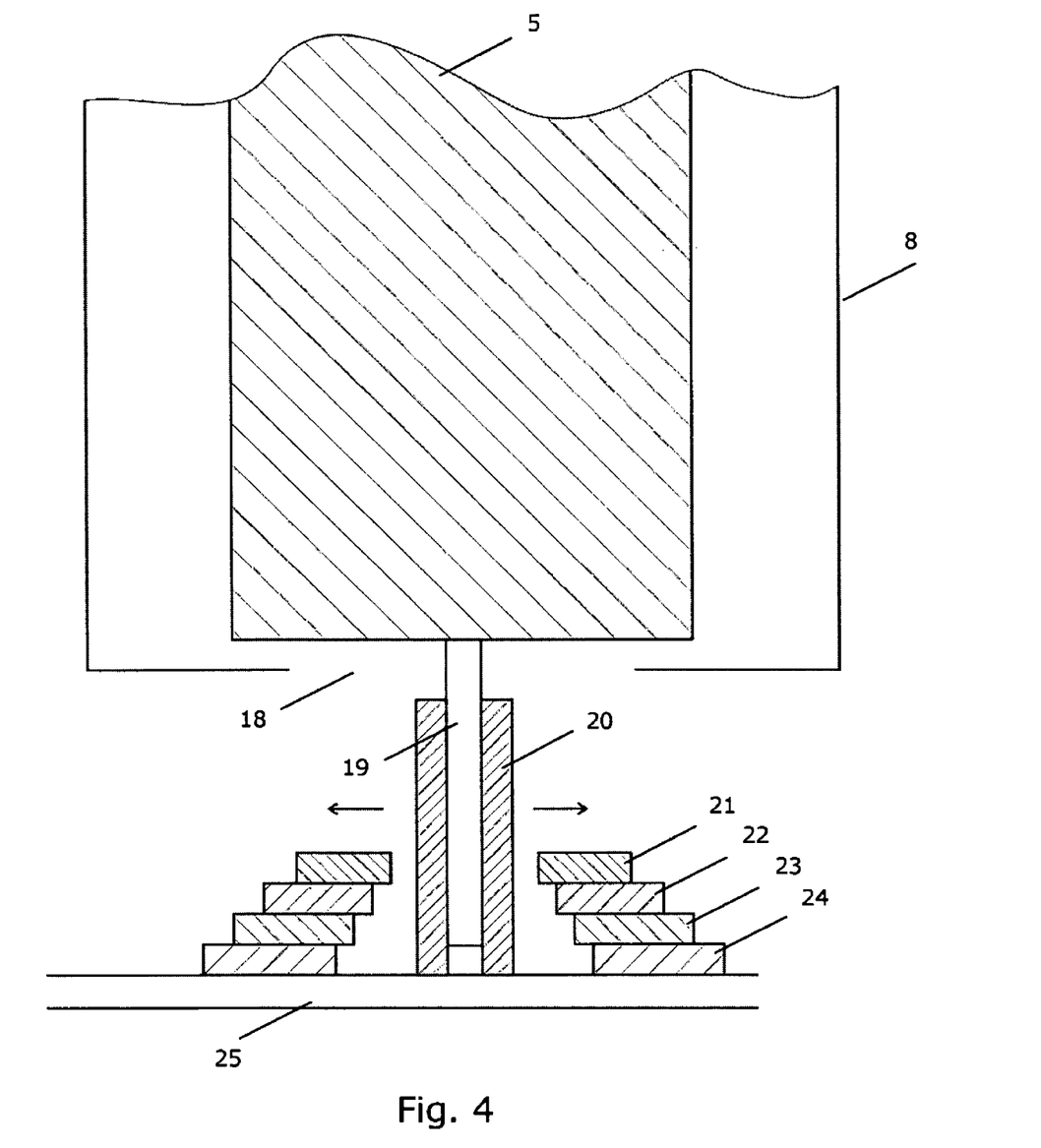
FIG. 4 shows a detailed depiction of a friction damper according to a second embodiment.

In FIGS. 2 and 3 the friction plates are activated by the suspension wires/rods. Alternatively, the friction plates can be activated by a separate arrangement attached to the pendulum structure cf. FIG. 4 where the friction plates are positioned below the pendulum. In FIG. 4 an opening 18 is provided in the bottom section of the safety enclosure 8, and a rod 19 surrounded by a lining 20 is attached to the pendulum stricture 5. The lining 20 is free to move along the longitudinal direction of the rod 19.

Hence, when the wind power tower and the pendulum mass structure 5 moves relative to each other, the friction plates 21, 22, 23 and 24 are displaced relative to the base plate 25 and relative to each other. Due to frictional forces internally between the friction plates 21, 22, 23 and 24, and between friction plate 24 and the base plate 25 oscillations of the wind turbine is effectively damped. The base plate 25 is fixedly attached to the wind turbine tower (not shown). The outer lining 20 can be made of a polymer material in order to obtain an essentially silent interaction with the friction plates 21, 22, 23 and 24.

As previously stated a combination of the damping arrangements depicted in FIGS. 3 and 4 is also applicable.

The friction plates can be made of stainless steel, but other materials are also applicable. The diameters of the friction plates are typically in the range 10-1000 mm. The thickness of the friction plates can be essentially the same or it can be different. Typical thicknesses are 1-100 mm. The weight of the friction plates should be matched to the weight of the pendulum to obtain maximum damping of the tower oscillations. Typical weights of the friction plates are within the range 0.1-10% of the mass of the pendulum.

In FIGS. 2-4 the number of friction plates is four and the friction plates are depicted as disc-shaped friction plates. Obviously, the number of friction plates may be different from four, and the shape of the friction plates can be different from disc-shaped, such as quadratic or rectangular friction plates.

Also, it should be noted that the through-going openings can be implemented as for example circularly or elliptically shaped through-going openings. The dimensions of the through-going openings are typically within the range 10-200 mm. With reference to FIG. 3, the through-going opening of friction plate 13 is smaller than the through-going opening of friction plate 14. Similarly, the through-going opening of friction plate 14 is smaller than the through-going opening of friction plate 15 etc.

The invention claimed is:

1. A method for damping oscillations in a wind turbine comprising a wind turbine tower, a nacelle arranged on top of the wind turbine tower, and a number of rotor blades rotatably connected to the nacelle, the oscillations being generated by forces induced on the nacelle and the wind turbine tower by the rotating rotor blades, the method comprising:
    providing an internally suspended pendulum mass structure being operationally connected to an upper tower section;
    providing a platform being fixedly attached to the upper tower section; and
    providing a plurality of stacked, mutually displaceable friction plates being displaceably arranged relative to the platform, the plurality of stacked, mutually displaceable friction plates being adapted to be displaced relative to the platform in response to relative movements between the suspended pendulum mass structure and the platform in order to dissipate energy from the suspended pendulum mass structure by friction.

2. The method according to claim 1, wherein the suspended pendulum mass structure is operationally connected to the upper tower section via one or more suspension rods, via one or more suspension wires or via a combination thereof.

3. The method according to claim 2, wherein the plurality of stacked, mutually displaceable friction plates are adapted to be displaced, directly or indirectly, by the one or more suspension rods, the one or more suspension wires or a combination thereof.

4. The method according to claim 1, wherein the plurality of stacked, mutually displaceable friction plates are adapted to be displaced, directly or indirectly, by an activation element fixedly attached to the suspended pendulum mass structure.

5. The method according to claim 1, wherein the suspended pendulum mass structure is arranged in an excentric manner relative to a longitudinal centre axis of the wind turbine tower.

6. A wind turbine comprising a wind turbine tower, a nacelle arranged on top of said wind turbine tower, and a number of rotor blades rotatably connected to the nacelle, the wind turbine further comprising an arrangement for damping oscillations being generated by forces induced on the nacelle and the wind turbine tower by the rotating rotor blades, said arrangement comprising
    an internally suspended pendulum mass structure being operationally connected to an upper tower section,
    a platform arranged inside the upper tower section and fixedly attached thereto, and
    a plurality of stacked, mutually displaceable friction plates being displaceably arranged relative to the platform, the plurality of stacked, mutually displaceable friction plates being adapted to be displaced relative to the platform in response to relative movements between the suspended pendulum mass structure and the platform in order to dissipate energy from the suspended pendulum mass structure by friction.

7. The wind turbine according to claim 6, further comprising safety enclosure means at least partly encapsulating the suspended pendulum mass structure, the safety enclosure means being adapted to maintain the suspended pendulum mass structure in a secure position during abnormal wind turbine working conditions.

8. The wind turbine according to claim 7, wherein the safety enclosure means is implemented in such a way that the suspended pendulum mass structure is allowed to oscillate with a predetermined maximum amplitude.

9. The wind turbine according to claim 6, wherein the safety enclosure means is fixedly attached to the upper wind turbine tower section.

10. The wind turbine according to claim 6, wherein the safety enclosure means is fixedly attached to the platform.

11. The wind turbine according to claim 6, wherein the suspended pendulum mass structure is arranged in an excentric manner relative to a longitudinal centre axis of the wind turbine tower.

* * * * *

UNITED STATES PATENT AND TRADEMARK OFFICE
CERTIFICATE OF CORRECTION

| | |
|---|---|
| PATENT NO. | : 7,928,593 B2 |
| APPLICATION NO. | : 12/744614 |
| DATED | : April 19, 2011 |
| INVENTOR(S) | : Borge Ollgaard |

It is certified that error appears in the above-identified patent and that said Letters Patent is hereby corrected as shown below:

At column 2, line approx. 23, "an excentric manner", should read -- an eccentric manner --.

At column 3, line approx. 22, "service personal", should read -- service personnel --.

At column 4, line approx. 44, "an excentric manner", should read -- an eccentric manner --.

At column 6, line approx. 4, "does exceed", should read -- does not exceed --.

At column 6, lines approx. 21-22, "wind turbine tower and the pendulum mass structure 5 moves", should read -- wind turbine tower and the pendulum mass structure 5 move --.

At column 6, lines approx. 26-27, "oscillations of the wind turbine is" should read -- oscillations of the wind turbine are --.

At column 6, line approx. 59, "personal", should read -- personnel --.

At column 6, line approx 62, "personal is", should read -- personnel are --.

At column 7, lines approx. 12-13, "tower and the pendulum mass structure 5 moves", should read -- tower and the pendulum mass structure 5 move. --.

At column 7, line approx. 18, "is effectively", should read -- are effectively --.

At column 8, line approx. 22, "excentric", should read -- eccentric --.

At column 8, lines approx. 58-59, "excentric", should read -- eccentric --.

Signed and Sealed this
Twenty-ninth Day of November, 2011

David J. Kappos
*Director of the United States Patent and Trademark Office*